(12) United States Patent
Koide

(10) Patent No.: US 8,384,511 B2
(45) Date of Patent: Feb. 26, 2013

(54) PHOTORECEPTOR DEVICE, LIQUID CRYSTAL APPARATUS, AND ELECTRONIC APPARATUS

(75) Inventor: Shin Koide, Chino (JP)

(73) Assignee: Sony Corporation, Tokyo (JP)

( * ) Notice: Subject to any disclaimer, the term of this patent is extended or adjusted under 35 U.S.C. 154(b) by 1279 days.

(21) Appl. No.: 11/790,408

(22) Filed: Apr. 25, 2007

(65) Prior Publication Data

US 2008/0007395 A1    Jan. 10, 2008

(30) Foreign Application Priority Data

Jul. 5, 2006   (JP) .................................. 2006-185206
Feb. 2, 2007   (JP) .................................. 2007-023805

(51) Int. Cl.
*G05B 23/02* (2006.01)

(52) U.S. Cl. .......................................... 340/3.1; 349/62

(58) Field of Classification Search .................. 340/3.1; 345/84, 102; 455/574; 349/149, 62
See application file for complete search history.

(56) References Cited

U.S. PATENT DOCUMENTS

| | | | | |
|---|---|---|---|---|
| 5,146,351 A | * | 9/1992 | Maehara | 358/448 |
| 7,068,333 B2 | * | 6/2006 | Ohashi et al. | 349/68 |
| 7,145,599 B2 | * | 12/2006 | Takeda | 348/247 |
| 7,349,003 B2 | * | 3/2008 | Shiota et al. | 347/236 |
| 2004/0192411 A1 | * | 9/2004 | Shim | 455/574 |
| 2006/0119590 A1 | * | 6/2006 | Park et al. | 345/175 |
| 2007/0070002 A1 | | 3/2007 | Fujita et al. | |
| 2007/0070025 A1 | | 3/2007 | Fujita et al. | |
| 2007/0070264 A1 | | 3/2007 | Fujita et al. | |

FOREIGN PATENT DOCUMENTS

| | | |
|---|---|---|
| JP | A-2002-43610 | 2/2002 |
| JP | A 2005-121997 | 5/2005 |

* cited by examiner

*Primary Examiner* — Vernal Brown
(74) *Attorney, Agent, or Firm* — K&L Gates LLP

(57) ABSTRACT

A photoreceptor device includes a photoreceptor unit, a detector, an amount-of-light controller, and a correcting unit. The photoreceptor unit includes one or more photoelectric converter elements, and converts received light into an electric signal and outputs the electric signal. The detector detects an illuminance of ambient light received by the photoreceptor unit, on the basis of the electric signal. The amount-of-light controller controls an amount of light incident on the photoreceptor unit. The correcting unit corrects the illuminance of ambient light detected by the detector, on the basis of the electric signal output from the photoreceptor unit when the photoreceptor unit is shielded from light.

16 Claims, 6 Drawing Sheets

PHOTORECEPTOR DEVICE, LIQUID CRYSTAL APPARATUS, AND ELECTRONIC APPARATUS

BACKGROUND

1. Technical Field

The present invention relates to photoreceptor devices, liquid crystal apparatuses including photoreceptor devices, and electronic apparatuses including photoreceptor devices.

2. Related Art

Photoreceptor devices that detect illuminance of ambient light have been available. Such a photoreceptor device includes, for example, a photoelectric converter element and an illuminance detecting circuit.

The photoelectric converter element converts received ambient light into an electric signal and outputs the electric signal. The magnitude of the electric signal changes according to the amount of ambient light received by the photoelectric converter element. That is, the magnitude of the output electric signal becomes larger as the amount of ambient light received becomes larger, and the magnitude of the output electric signal becomes smaller as the amount of ambient light received becomes smaller.

The illuminance detecting circuit detects an illuminance of ambient light on the basis of the magnitude of the electric signal output from the photoelectric converter element. More specifically, the illuminance detecting circuit measures the magnitude of the electric signal output from the photoelectric converter element, and determines the amount of ambient light received by the photoelectric converter element such that the amount of ambient light becomes larger as the magnitude of the electric signal becomes larger and the amount of ambient light becomes smaller as the magnitude of the electric signal becomes smaller. Then, the illuminance detecting circuit detects an illuminance of ambient light on the basis of the amount of ambient light that has been determined.

Such a photoreceptor device is provided, for example, in a liquid crystal apparatus. Such a liquid crystal apparatus is described, for example, in JP-A-2005-121997. The liquid crystal apparatus described in JP-A-2005-121997 includes a liquid crystal panel, and a backlight that is provided opposing the liquid crystal panel and that emits light toward the liquid crystal panel.

The liquid crystal panel includes a pair of substrates and liquid crystal provided between the pair of substrates. The liquid crystal panel has a pair of electrodes, and driving voltages are applied to the liquid crystal via the pair of electrodes to change the orientation or order of the liquid crystal. This causes variation in the amount of light transmitted from the backlight through the liquid crystal, whereby multi-level display is achieved.

The visibility of display on the liquid crystal apparatus changes depending on the ambient illuminance of the liquid crystal apparatus, which is attributable to ambient light, such as sunlight. That is, as the ambient illuminance of the liquid crystal apparatus increases, the difference between the ambient illuminance of the liquid crystal apparatus and the illuminance of a display area of the liquid crystal apparatus decreases, so that the visibility of display on the liquid crystal apparatus is reduced.

In order to alleviate this problem, the illuminance of ambient light is detected by the photoreceptor device described above, and the amount of light emitted from the backlight is controlled on the basis of the detected illuminance of ambient light. Thus, the amount of light supplied from the backlight toward the liquid crystal panel is controlled on the basis of the ambient illuminance of the liquid crystal apparatus, so that the visibility of display on the liquid crystal apparatus is improved.

The characteristics of the photoelectric converter element included in the photoreceptor device gradually change as ambient light is received or time elapses during the operation of the liquid crystal apparatus. When the characteristics of the photoelectric converter element change, the magnitude of the electric signal output from the photoelectric converter element changes even when the amount of ambient light received is the same. Thus, an error could occur in the illuminance of ambient light detected by the photoreceptor device.

SUMMARY

An advantage of some aspects of the invention is that error can be reduced in detection of the illuminance of ambient light even when the characteristics of a photoelectric converter change in a photoreceptor device or an electronic apparatus.

According to an aspect of the invention, a photoreceptor device includes a photoreceptor unit, a detector, an amount-of-light controller, and a correcting unit. The photoreceptor unit includes one or more photoelectric converter elements, and converts received light into an electric signal and outputs the electric signal. The detector detects an illuminance of ambient light received by the photoreceptor unit, on the basis of the electric signal. The amount-of-light controller controls an amount of light incident on the photoreceptor unit. The correcting unit corrects the illuminance of ambient light detected by the detector, on the basis of the electric signal output from the photoreceptor unit with the photoreceptor unit shielded from light.

That is, the correcting unit corrects the illuminance of ambient light detected by the detector, on the basis of the electric signal output from the photoreceptor unit in a light-shielded state.

More specifically, before the characteristics of a photoelectric converter element change, an electric signal output from the photoelectric converter element in the light-shielded state is measured. After the characteristics of the photoelectric converter element change, and electric signal output from the photoelectric converter element in a light-receiving state and an electric signal output from the photoelectric converter element in a light-shielded state are measured. Then, the difference between the electric signal measured in the light-shielded state before the characteristics of the photoelectric converter element change and the electric signal measured in the light-shielded state after the characteristics of the photoelectric converter element change, i.e., the effect of the change in the characteristics of the photoelectric converter element, is obtained. Then, the illuminance of ambient light detected by the detector is corrected on the basis of the difference described above.

Thus, the illuminance of ambient light detected by the detector is corrected in consideration of the effect of the change in the characteristics of the photoelectric converter element. Accordingly, error can be reduced in detection of the illuminance of ambient light even when the characteristics of the photoelectric converter element change.

Preferably, in the photoreceptor device, the photoreceptor unit includes a first photoelectric converter element and a second photoelectric converter element, the first photoelectric converter element being configured to receive an amount of light controlled by the amount-of-light controller, and the second photoelectric converter element being shielded from light. In this case, the correcting unit corrects the illuminance of ambient light detected by the detector, on the basis of an electric signal output from the first photoelectric converter element with the first photoelectric converter element shielded from light and an electric signal output from the second photoelectric converter element.

The characteristics of photoelectric converter elements change as light is received. Thus, as time elapses, difference in characteristics arises between the first photoelectric converter element, which can be allowed to receive light, and the second photoelectric converter element, which remains shielded from light and does not receive light. Therefore, the electric signal output from the first photoelectric converter element in the light-shielded state can be different from the electric signal output from the second photoelectric converter element. Accordingly, the correcting unit corrects the illuminance of ambient light detected by the detector, on the basis of an electric signal output from the first photoelectric converter element with the first photoelectric converter element shielded from light and an electric signal output from the second photoelectric converter element.

More specifically, first, an electric signal output from the first photoelectric converter element with the first photoelectric converter element shielded from light and an electric signal output from the second photoelectric converter element are measured. Then, the difference between the electric signal from the first photoelectric converter element in the light-shielded state and the electric signal from the second photoelectric converter element that have been measured, i.e., the effect of the change in the characteristics of the first photoelectric converter element, is obtained. Then, an electric signal output from the first photoelectric converter element in a light-receiving state is measured, and the illuminance of ambient light detected by the detector is corrected on the basis of the difference described above.

Thus, the illuminance of ambient light detected by the detector is corrected in consideration of the effect of the change in the characteristics of the first photoelectric converter element due to reception of light. Accordingly, error can be reduced in detection of the illuminance of ambient light even when the characteristics of the first photoelectric converter element change due to reception of light.

Furthermore, in the photoreceptor device, preferably, the illuminance of ambient light detected by the detector is corrected by controlling either one of or both the electric signal output from the first photoelectric converter element and the electric signal output from the second photoelectric converter element.

In this case, the correcting unit controls either one of or both the electric signal output from the first photoelectric converter element and the electric signal output from the second photoelectric converter element on the basis of the electric signal output from the first photoelectric converter element in the light-shielded state and the electric signal output from the second photoelectric converter element.

More specifically, first, an electric signal output from the first photoelectric converter element with the first photoelectric converter element shielded from light and an electric signal output from the second photoelectric converter element are measured. Then, the difference between the electric signal from the first photoelectric converter element in the light-shielded state and the electric signal from the second photoelectric converter element that have been measured, i.e., the effect of the change in the characteristics of the first photoelectric converter element, is obtained. Then, on the basis of the difference described above, either one of or both the electric signal output from the first photoelectric converter element and the electric signal output from the second photoelectric converter element are controlled. For example, this control is exercised so that the electric signal output from the first photoelectric converter element and the electric signal output from the second photoelectric converter element become equal. Obviously, the control may be exercised so that the electric signal output from the first photoelectric converter element and the electric signal output from the second photoelectric converter element have certain relationships without limitation to equality.

By controlling the electric signal output from the first photoelectric converter element in the light-shielded state or the electric signal output from the second photoelectric converter element, the effect of change in the characteristics of the first photoelectric converter element due to reception of light can be removed from the electric signal output from the first photoelectric converter element and the electric signal output from the second photoelectric converter element. Accordingly, error can be reduced in detection of the illuminance of ambient light even when the characteristics of the first photoelectric converter element change due to reception of light.

According to another aspect of the invention, a liquid crystal apparatus includes a liquid crystal panel; an illuminating device that illuminates the liquid crystal panel; and a photoreceptor device. The photoreceptor device includes a photoreceptor unit, a detector, an amount-of-light controller, and a correcting unit. The photoreceptor unit includes one or more photoelectric converter elements, and converts received light into an electric signal and outputs the electric signal, the photoreceptor unit. The detector detects an illuminance of ambient light received by the photoreceptor unit, on the basis of the electric signal. The amount-of-light controller controls an amount of light incident on the photoreceptor unit. The correcting unit corrects the illuminance of ambient light detected by the detector, on the basis of the electric signal output from the photoreceptor unit with the photoreceptor unit shielded from light. An amount of light emitted by the illuminating device is controlled on the basis of the amount of ambient light detected by the photoreceptor device. Preferably, in the liquid crystal apparatus, the photoreceptor unit includes a first photoelectric converter element and a second photoelectric converter element, the first photoelectric converter element being configured to receive an amount of light controlled by the amount-of-light controller, and the second photoelectric converter element being shielded from light. In this case, the correcting unit corrects the illuminance of ambient light detected by the detector, on the basis of an electric signal output from the first photoelectric converter element when the photoelectric converter element is shielded from light and an electric signal output from the second photoelectric converter element. Furthermore, in the liquid crystal apparatus, preferably, the illuminance of ambient light detected by the detector is corrected by controlling either one of or both the electric signal output from the first photoelectric converter element and the electric signal output from the second photoelectric converter element.

The illuminance of ambient light is detected by the photoreceptor device, and the amount of light emitted from the illuminating device is controlled on the basis of the detected illuminance of ambient light. Thus, the amount of light transmitted from the illuminating device toward the liquid crystal panel is adjusted, so that the visibility of display on the liquid crystal apparatus is improved. Accordingly, even when the characteristics of the photoelectric converter elements change as time elapses, since the relationship between the amount of light emitted by the illuminating device and the illuminance of ambient light remains the same, the visibility of the liquid crystal apparatus can be maintained for a longer period. The illuminating device is typically a backlight that illuminates the liquid crystal panel from the backside. Alternatively, however, a front light that illuminates the liquid crystal panel from the viewing side, a side light that illuminates the liquid crystal panel from a lateral side, or the like may be used. The first and second photoelectric converter elements may be formed on a glass substrate forming the liquid crystal panel.

According to yet another aspect of the invention, an electronic apparatus includes a first portion including a photoreceptor device, and a second portion movably attached to the first portion so as to allow shielding the photoreceptor device from light. The photoreceptor device includes a photoreceptor unit, a detector, and a correcting unit. The photoreceptor unit converts received light into an electric signal and that outputs the electric signal, the photoreceptor unit including one or more photoelectric converter elements. The detector detects an illuminance of ambient light received by the photoreceptor unit, on the basis of the electric signal. The correcting unit corrects the illuminance of ambient light detected by the detector, on the basis of the electric signal output from the photoreceptor unit with the photoreceptor unit shielded from light by the amount-of-light controller. Preferably, in the electronic apparatus, the photoreceptor unit includes a first photoelectric converter element and a second photoelectric converter element, the first photoelectric converter element being configured to receive an amount of light controlled by the second portion, and the second photoelectric converter element being shielded from light. In this case, the correcting unit corrects the illuminance of ambient light detected by the detector, on the basis of an electric signal output from the first photoelectric converter element when the photoelectric converter element is shielded from light and an electric signal output from the second photoelectric converter element. Furthermore, in the electronic apparatus, preferably, the illuminance of ambient light detected by the detector is corrected by controlling either one of or both the electric signal output from the first photoelectric converter element and the electric signal output from the second photoelectric converter element.

Examples of the electronic apparatus include a cellular phone, a personal computer, a mobile device, or the like, in which the liquid crystal apparatus described earlier is provided in the first portion and in which a main unit having an operation unit or the like is provided in the second portion. Particularly, in the case of an electronic apparatus the first portion can be opened and closed relative to the second portion by a folding mechanism or a sliding mechanism, light shielding of the photoreceptor device can be controlled by opening or closing the first portion relative to the second portion.

BRIEF DESCRIPTION OF THE DRAWINGS

The invention will be described with reference to the accompanying drawings, wherein like numbers reference like elements.

DESCRIPTION OF EXEMPLARY EMBODIMENTS

Now, embodiments of the invention will be described with reference to the drawings. Regarding the embodiments and modifications described below, like elements are designated by like numbers, and descriptions thereof will be omitted or simplified.

First Embodiment

Figure 1:
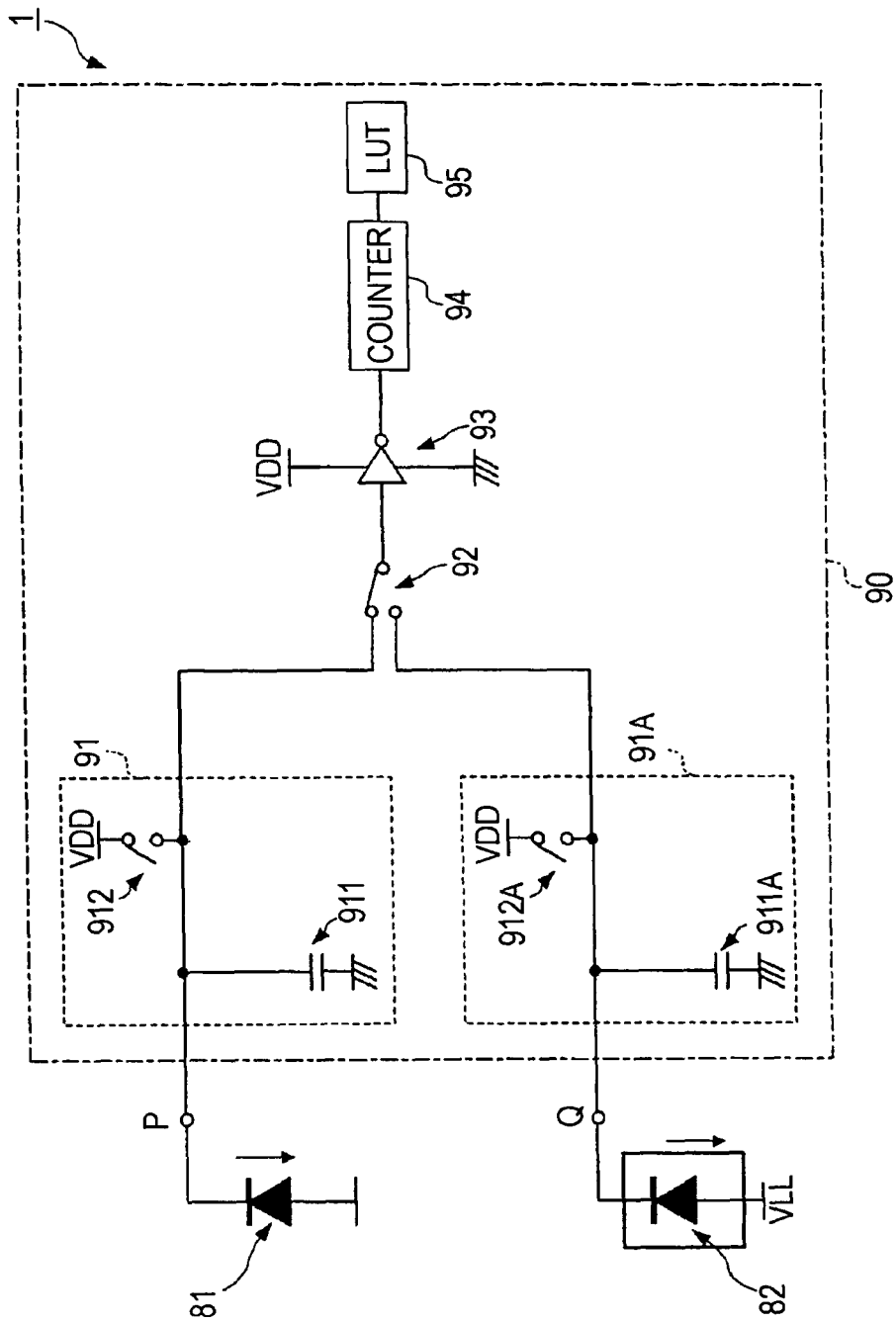
FIG. 1 is a circuit diagram of a photoreceptor device according to a first embodiment of the invention.

FIG. 1 is a circuit diagram of a photoreceptor device 1 according to a first embodiment of the invention.

The photoreceptor device 1 includes photoelectric converter elements, namely, a first PIN diode 81 and a second PIN diode 82, and an illuminance detecting circuit 90. The first and second PIN diodes 81 and 82 function as a photoreceptor unit, and the illuminance detecting circuit 90 functions as an illuminance detector.

The first PIN diode 81 takes on either a light-receiving state, in which ambient light is received, or a light-shielded state, in which ambient light is blocked. When in the light-receiving state, the first PIN diode 81 outputs a current in the direction from the cathode to the anode thereof in accordance with the illuminance of ambient light and factors such as the temperature of the first PIN diode 81 itself. On the other hand, when in the light-shielded state, the first PIN diode 81 outputs a current in the direction from the cathode to the anode thereof in accordance with the effects of factors other than the illuminance of ambient light, such as the temperature of the first PIN diode 81 itself.

The anode of the first PIN diode 81 is connected to a low-side power supply VLL, and the cathode of the first PIN diode 81 is connected to a terminal P. Thus, a current output from the first PIN diode 81 flows through the terminal P.

The second PIN diode 82 is always in a light-shielded state. The second PIN diode 82 constantly outputs a current in the direction from the cathode to the anode thereof in accordance with the effects of factors other than the illuminance of ambient light, such as the temperature of the second PIN diode 82 itself.

The anode of the second PIN diode 82 is connected to the low-side power supply VLL, and the cathode of the second PIN diode 82 is connected to a terminal Q. Thus, a current output from the second PIN diode 82 flows through the terminal Q.

The illuminance detecting circuit 90 includes a first detecting circuit 91, a second detecting circuit 91A, a selecting circuit 92, an inverter 93, a counter 94, and a look-up table (LUT) 95 that serves as a correcting unit.

The first detecting circuit 91 includes a capacitor 911 and a switching element 912. The first detecting circuit 91 changes the voltage at the terminal P according to the current that flows through the terminal P.

The second detecting circuit 91A includes a capacitor 911A and a switching element 912A. The second detecting circuit 91A changes the voltage at the terminal Q according to the current that flows through the terminal Q.

The switching elements 912 and 912A operate in cooperation with each other, thereby charging the capacitors 911 and 911A, respectively.

More specifically, a first end of the switching element 912 is connected to a first electrode of the capacitor 911, and a second end of the switching element 912 is connected to a voltage VDD of a high-side power supply. Similarly, a first end of the switching element 912A is connected to a first end of the capacitor 911A, and a second end of the switching element 912A is connected to the voltage VDD of the high-side power supply.

When the switching element 912 and the switching element 912A are turned on, charges are supplied from the voltage VDD of the high-side power supply to the capacitors 911 and 911A via the switching elements 912 and 912A that have been turned on, whereby the capacitors 911 and 911A are charged, respectively.

The capacitors 911 and 911A are discharged according to currents that flow through the terminals P and Q, respectively.

More specifically, the first electrode of the capacitor 911 is connected to the terminal P, and a second electrode of the capacitor 911 is connected to a voltage GND of a reference power supply. The capacitor 911 applies a voltage to the cathode of the first PIN diode 81 via the terminal P, the voltage corresponding to charges charged by the voltage VDD of the high-side power supply via the switching element 912. Thus, a reverse bias voltage is applied to the first PIN diode 81.

When in the light-receiving state, the first PIN diode 81 outputs a current in the direction from the cathode to the anode thereof in accordance with the illuminance of ambient light and factors such as the temperature of the first PIN diode 81 itself. Then, according to the current, charges that have been accumulated are gradually released from the capacitor 911, and a voltage corresponding to remaining charges is output from the first electrode of the capacitor 911.

On the other hand, in the light-shielded state, the first PIN diode 81 outputs a current in the direction from the cathode to the anode thereof in accordance with the effects of factors other than the illuminance of ambient light, such as the temperature of the first PIN diode 81 itself. Then, according to the current, charges that have been accumulated are gradually released from the capacitor 911, and a voltage corresponding to remaining charges is output from the first electrode of the capacitor 911.

Since the terminal P is connected to the first electrode of the capacitor 911, the voltage corresponding to the charges remaining at the capacitor 911 appears at the terminal P.

Furthermore, the first electrode of the capacitor 911A is connected to the terminal Q, and a second electrode of the capacitor 911A is connected to the voltage GND of the reference power supply. The capacitor 911A applies a voltage to the cathode of the second PIN diode 82 via the terminal Q, the voltage corresponding to charges charged by the voltage VDD of the high-side power supply via the switching element 912A. Thus, a reverse bias voltage is applied to the second PIN diode 82.

Then, the second PIN diode 82, which is always in the light-shielded state, outputs a current in the direction from the cathode to the anode thereof in accordance with the effects of factors other than the illuminance of ambient light, such as the temperature of the second PIN diode 82 itself. Then, according to the current, charges that have been accumulated are gradually released from the capacitor 911A, and a voltage corresponding to remaining charges is output from the first electrode of the capacitor 911A.

Since the terminal Q is connected to the first electrode of the capacitor 911A, the voltage corresponding to the charges remaining at the capacitor 911A appears at the terminal Q.

The selecting circuit 92 selectively outputs either the voltage at the terminal P or the voltage at the terminal Q.

More specifically, an input terminal of the selecting circuit 92 is connected to the terminal P and the terminal Q alternately at regular intervals, and an output terminal of the selecting circuit 92 is connected to an input terminal of the inverter 93. When the input terminal of the selecting circuit 92 is connected to the terminal P, the voltage at the terminal P is output from the output terminal of the selecting circuit 92. On the other hand, when the input terminal of the selecting circuit 92 is connected to the terminal Q, the voltage at the terminal Q is output from the output terminal of the selecting circuit 92.

The inverter 93 inverts the voltage output from the selecting circuit 92 and outputs the inverted voltage.

More specifically, the input terminal of the inverter 93 is connected to the output terminal of the selecting circuit 92, and an output terminal of the inverter 93 is connected to an input terminal of the counter 94. The inverter 93 outputs the voltage VDD when the voltage output from the output terminal of the selecting circuit 92 is lower than a predetermined threshold voltage, and outputs the voltage GND when the voltage output from the output terminal of the selecting circuit 92 is higher than the predetermined threshold voltage.

The counter 94 measures a time that it takes until the voltage VDD is output from the inverter 93 on the basis of the voltage at the terminal P, and maintains a value representing the time. In another period, the counter 94 measures a time it takes until the voltage VDD is output from the inverter 93 on the basis of the voltage at the terminal Q after the selecting circuit 92 is connected to the terminal Q, and maintains a value representing the time. Then, an illuminance of ambient light is detected on the basis of the difference between these values.

More specifically, the input terminal of the counter 94 is connected to the output terminal of the inverter 93, and an output terminal of the counter 94 is connected to an input terminal of the LUT 95. The counter 94 finishes time measurement when the voltage VDD is output from the inverter 93 on the basis of the voltage at the terminal P, and maintains a value representing the time measured. In another period, the counter 94 finishes time measurement when the selecting circuit 92 is connected to the terminal Q and the voltage VDD is output from the inverter 93 on the basis of the voltage at the terminal Q, and maintains a value representing the time measured.

The LUT 95 detects an illuminance of ambient light on the basis of the difference between the two values representing the times measured by the counter 94, and corrects the detected illuminance of ambient light.

The input terminal of the LUT 95 is connected to the output terminal of the counter 94.

First, detection of an illuminance of ambient light by the LUT 95 based on times measured by the counter 94 will be described.

The LUT 95 determines the amount of ambient light on the basis of times measured by the counter 94, and detects an illuminance of ambient light on the basis of the amount of ambient light.

For example, as the difference between the two values representing the times measured by the counter 94 becomes larger, since this indicates that the difference between the degree of decrease in the voltage at the terminal P and the degree of decrease in the voltage at the terminal Q is larger, the difference between the current output from the first PIN diode 81 and the current output from the second PIN diode 82 becomes larger. This indicates that the effect of illuminance of ambient light is intense, so that it is determined that the amount of ambient light is large.

On the other hand, as the difference between the two values of times measured by the counter 94 becomes smaller, since this indicates the degree of decrease in the voltage at the terminal P and the degree of decrease in the voltage at the terminal Q become closer to each other, the difference between the current output from the first PIN diode 81 and the current output from the second PIN diode 82 becomes smaller. This indicates that the effect of illuminance of ambient light is small, so that it is determined that the amount of ambient light is small.

On the basis of the amount of light determined in the manner described above, an illuminance of ambient light is detected.

Next, correction of the detected illuminance of ambient light by the LUT 95 will be described.

On the basis of the voltage at the terminal P, the LUT 95 detects the amount of change in illuminance that is attributable to change in the characteristics of the first PIN diode 81, and corrects the detected illuminance of ambient light on the basis of the change in illuminance.

Now, an operation of the LUT 95 will be described with reference to FIGS. 2A and 2B.

Figure 2A:
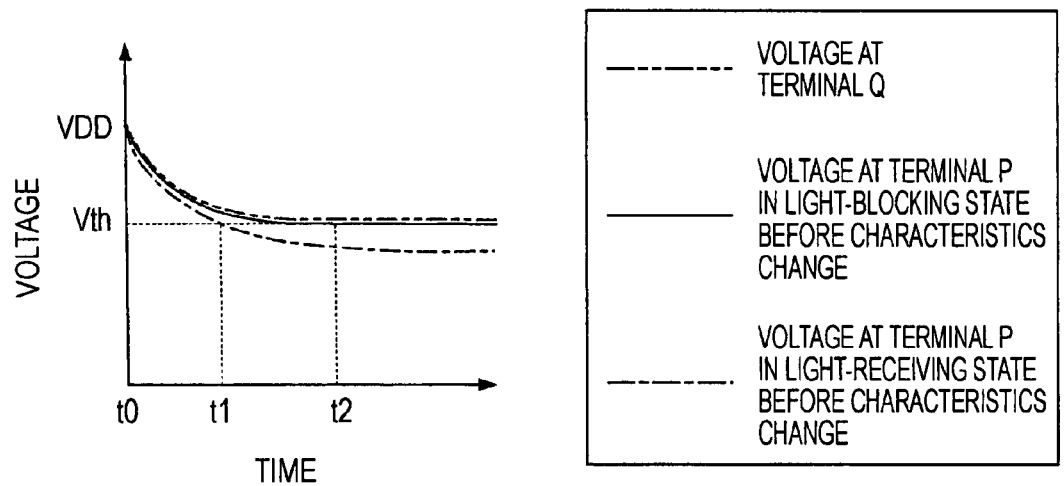
FIGS. 2A and 2B are timing charts of the photoreceptor device.
Figure 2B:
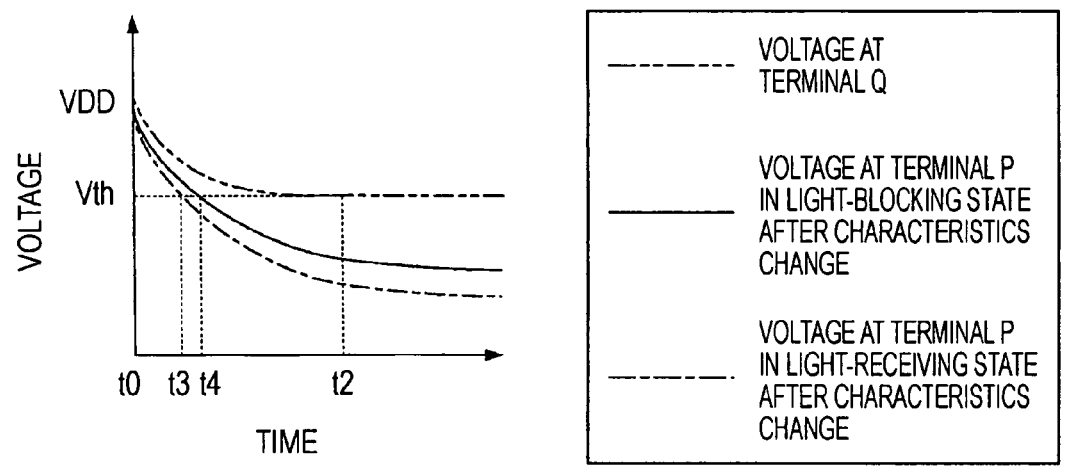

FIGS. 2A and 2B show changes in the voltages at the terminals P and Q in relation to elapse of time, with the horizontal axis representing time and the vertical axis representing voltage. In FIGS. 2A and 2B, the time represented along the horizontal axis is sufficiently shorter than the time it takes for change in the characteristics of the first PIN diode 81, and Vth denotes the threshold voltage of the inverter 93 described earlier.

First, the voltage at the terminal Q is measured. As indicated by a double-dotted line in FIG. 2A and a double-dotted line in FIG. 2B, the voltage at the terminal Q gradually decreases as time elapses.

More specifically, at time t0, the switching element 912 that has been ON is turned OFF. Then, according to the current that flows through the terminal Q in accordance with the effects of factors other than the illuminance of ambient light, such as the temperature of the first PIN diode 81 itself, the capacitor 911A that has been fully charged is gradually discharged. Thus, the voltage at the terminal Q, which is the voltage VDD at time t0, gradually decreases and becomes the voltage Vth at time t2.

Then, before the characteristics of the first PIN diode 81 change, the voltage at the terminal P with the first PIN diode 81 in the light-shielded state is measured. Then, as indicated by a solid line in FIG. 2A, the voltage at the terminal P in the light-shielded state, measured before the characteristics of the first PIN diode 81 change, decreases as time elapses.

More specifically, at time t0, before the characteristics of the first PIN diode 81 change, the first PIN diode 81 is caused to enter the light-shielded state, and the switching element 912 that has been ON is turned OFF. Then, according to the current that flows through the terminal P in accordance with the effects of factors other than the illuminance of ambient light, such as the temperature of the first PIN diode 81 itself, the capacitor 911 that has been fully charged is gradually discharged. Since the characteristics of the first PIN diode 81 have not changed yet and the first PIN diode 81 is in the light-shielded state, the first PIN diode 81 outputs the same current as the second PIN diode 82. Thus, similarly to the voltage at the terminal Q indicated by the double-dotted line in FIG. 2A, the voltage at the terminal P, which is the voltage VDD at time t0, becomes the voltage Vth at time t2.

Although not actually measured, the voltage at the terminal P with the first PIN diode 81 in the light-receiving state before the characteristics of the first PIN diode 81 change decreases as time elapses, as indicated by a single-dotted line in FIG. 2A.

More specifically, at time t0, before the characteristics of the first PIN diode 81 change, the first PIN diode 81 is caused to enter the light-receiving state, and the switching element 912 that has been turned ON is turned OFF. Then, according to the current that flows through the terminal P in accordance with the illuminance of ambient light and factors such as the temperature of the first PIN diode 81 itself, the capacitor 911 that has been fully charged is gradually discharged. Compared with the case of the light-shielded state, the current that flows through the terminal P is larger by an amount corresponding to the effect of illuminance of ambient light, so that the capacitor 911 is discharged rapidly. Thus, the voltage at the terminal P, which is the voltage VDD at time t0, becomes the voltage Vth at time t1.

Then, after the characteristics of the first PIN diode 81 change, the voltage at the terminal P with the first PIN diode 81 in the light-shielded state is measured. Then, compared with the voltage at the terminal P in the light-shielded state measured before the characteristics of the first PIN diode 81 change, indicated by the solid line in FIG. 2A, the voltage at the terminal P in the light-shielded state measured after the characteristics of the first PIN diode 81 change rapidly decreases as time elapses, as indicated by a solid line in FIG. 2B.

More specifically, at time t0, after the characteristics of the first PIN diode 81 change, the first PIN diode 81 is caused to enter the light-shielded state, and the switching element 912 that has been turned ON is turned OFF. Then, according to the current that flows through the terminal P in accordance with the effects of factors other than the illuminance of ambient light, such as the temperature of the first PIN diode 81 itself, the capacitor 911 that has been fully charged is gradually discharged. Compared with the case before the characteristics of the first PIN diode 81 change, the current that flows through the terminal P is larger by an amount corresponding to the effect of change in the characteristics of the first PIN diode 81, so that the capacitor 911 is discharged rapidly. Thus, the voltage at the terminal P, which is the voltage VDD at time t0, becomes the voltage Vth at time t4.

Then, after the characteristics of the first PIN diode 81 change, the voltage at the terminal P with the first PIN diode 81 in the light-receiving state is measured. Then, compared with the voltage at the terminal P in the light-shielded state measured after the characteristics of the first PIN diode 81 change, indicated by the solid line in FIG. 2B, the voltage at the terminal P in the light-receiving state measured after the characteristics of the first PIN diode 81 change rapidly decrease as time elapses, as indicated by a single-dotted line in FIG. 2B.

More specifically, at time t0, after the characteristics of the first PIN diode 81 change, the first PIN diode 81 is caused to enter the light-receiving state, and the switching element 912 that has been ON is turned OFF. Then, according to the current that flows through the terminal P in accordance with the illuminance of ambient light and factors such as the temperature of the first PIN diode 81 itself, the capacitor 911 that has been fully charged is gradually discharged. Compared with the case of the light-shielded state, the current that flows through the terminal P is larger by an amount corresponding to the effect of the illuminance of ambient light, so that the capacitor 911 is discharged rapidly. Thus, the voltage at the terminal P, which is the voltage VDD at time t0, becomes the voltage Vth at time t3.

Thus, after the characteristics of the first PIN diode 81 change, first, an illuminance of ambient light is detected in the following manner.

At time t3, the inverter 93 outputs the voltage VDD on the basis of the voltage at the terminal P, so that the counter 94 finishes time measurement and maintains a value representing the time measured. In another period, the selecting circuit 92 is connected to the terminal Q, and at time t2, the inverter 93 outputs the voltage VDD on the basis of the voltage at the terminal Q, so that the counter 94 finishes time measurement and maintains a value representing the time measured. Then, on the basis of the difference between the two values of times measured by the counter 94, i.e., on the basis of the length of the period from time t3 to time t2, the LUT 95 detects an illuminance of ambient light.

Then, the detected illuminance of ambient light is corrected in the following manner.

First, regarding the period from time t4 to time t2, i.e., the period from the time when the voltage at the terminal P measured in the light-shielded state after the characteristics of the first PIN diode 81 change becomes the voltage Vth and the time when the voltage at the terminal P measured in the light-shielded state before the characteristics of the first PIN diode 81 change become the voltage Vth, the LUT 95 obtains an illuminance that has been changed due to the effect of the change in the characteristics of the first PIN diode 81. Then, the change in illuminance is added to the detected illuminance of ambient light.

Figure 3:
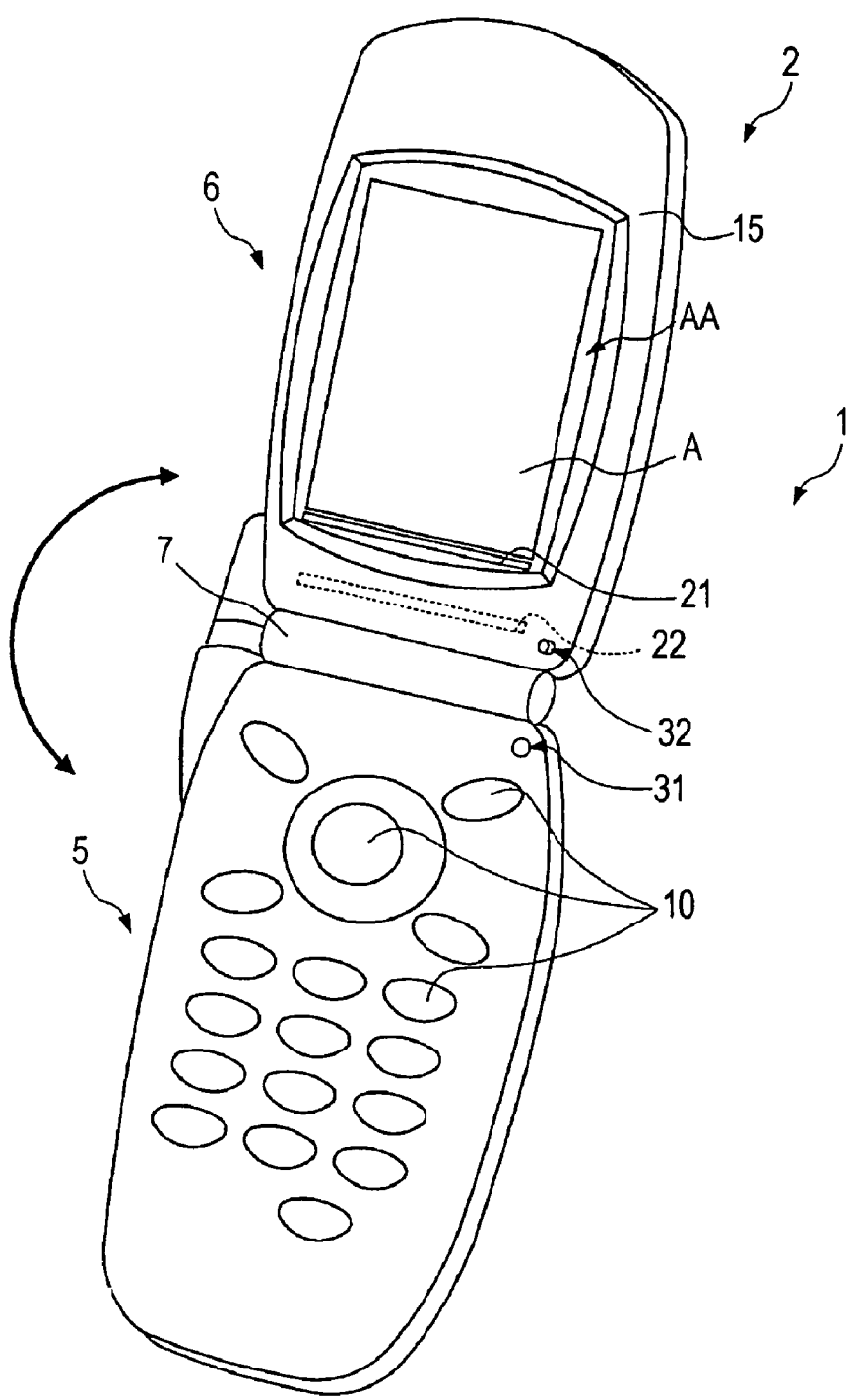
FIG. 3 is a perspective view of a cellular phone including the photoreceptor device.

FIG. 3 is a perspective view showing the configuration of a cellular phone 2, which is an electronic apparatus including the photoreceptor device 1.

The cellular phone 2 includes a main unit 5, a display 6 that functions as an amount-of-light controller, and a rotation shaft 7.

The main unit 5 has a plurality of operation buttons 10. The cellular phone 2 executes various operations according to operations of the plurality of operation buttons 10.

The display 6 has a liquid crystal panel AA, a backlight (not shown), and a case 15.

The backlight is provided opposing the liquid crystal panel AA, and emits light toward the liquid crystal panel AA.

The liquid crystal panel AA has a display area A for displaying an image using light received from the backlight, and a photoreceptor area 21 for receiving ambient light, provided adjacently to the display area A. In the photoreceptor area 21, the first PIN diode 81 shown in FIG. 1 is provided.

The case 15 is formed so as to cover the display 6 except the display area A and the photoreceptor area 21. In a portion of the area covered by the case 15, a light-shielded area 22 in which ambient light is blocked by the case 15 is formed. In the light-shielded area 22, the second PIN diode 82 shown in FIG. 1 is provided.

The rotation shaft 7 connects the main unit 5 and the display 6 so that the display 6 can be rotated relative to the main unit 5. That is, the display 6 can be rotated relative to the main unit 5 within a predetermined angle. When the display 6 is set at a minimum angle relative to the main unit 5, the cellular phone is folded. On the other hand, when the display 6 is set at a maximum angle relative to the main unit 5, the cellular phone 2 is opened.

On the main unit 5 and the display 6, a switch 31 and a recessed portion 32 are provided symmetrically with respect to the rotation shaft 7. When the cellular phone 2 is folded, the recessed portion 32 comes into contact with the switch 31. In the photoreceptor device 1, the first PIN diode 81 is in the light-shielded state when the recessed portion 32 is in contact with the switch 31, and the first PIN diode 81 is in the light-receiving state when the recessed portion 32 is not in contact with the switch 31.

The cellular phone 2 described above operates in the following manner.

When the cellular phone 2 is folded, ambient light incident toward the photoreceptor area 21 is blocked. Thus, the first PIN diode 81, which is provided in the photoreceptor area 21, enters the light-shielded state. Since the recessed portion 32 is in contact with the switch 31, the voltage at the terminal P with the first PIN diode 81 in the light-shielded state is measured. Then, on the basis of the measured voltage at the terminal P and the voltage at the terminal P measured in advance in the light-shielded state before the characteristics of the first PIN diode 81 change, the amount of change in illuminance that is attributable to the change in the characteristics of the first PIN diode 81 is obtained.

On the other hand, when the cellular phone 2 is opened, ambient light is cast on the photoreceptor area 21. Thus, the first PIN diode 81, which is provided in the photoreceptor area 21, enters the light-receiving state. Since the recessed portion 32 is not in contact with the switch 31, the voltage at the terminal P with the first PIN diode 81 in the light-receiving state and the voltage at the terminal Q are measured. Then, on the basis of the voltage at the terminal P with the first PIN diode 81 in the light-receiving state and the voltage at the terminal Q, an illuminance of ambient light is detected. Then, the amount of change in illuminance attributable to the change in the first PIN diode 81 is added to the detected illuminance of ambient light, and the amount of light emitted from the backlight is controlled according to the illuminance obtained by the addition.

According to this embodiment, the following advantage is achieved.

(1) On the basis of the voltage at the terminal P with the first PIN diode 81 in the light-shielded state, the LUT 95 corrects an illuminance of ambient light detected by the illuminance detecting circuit 90.

More specifically, first, before the characteristics of the first PIN diode 81 change, the voltage at the terminal P is measured with the first PIN diode 81 in the light-shielded state. Then, after the characteristics of the first PIN diode 81 change, the voltage at the terminal P is measured with the first PIN diode 81 in the light-shielded state, and also the voltage at the terminal P is measured with the first PIN diode 81 in the light-receiving state. Then, the difference between the voltage at the terminal P measured in the light-shielded state before the characteristics of the first PIN diode 81 change and the voltage at the terminal P measured in the light-shielded state measured after the characteristics of the first PIN diode 81 change, i.e., the effect of change in the characteristics of the first PIN diode 81, is obtained. Then, on the basis of the difference, the illuminance of ambient light detected by the illuminance detecting circuit 90 is corrected.

Thus, the illuminance of ambient light detected by the illuminance detecting circuit 90 is corrected in consideration of the effect of change in the characteristics of the first PIN diode 81. Accordingly, even when the characteristics of the first PIN diode 81 change, error can be reduced in detection of the illuminance of ambient light.

Second Embodiment

Figure 4:
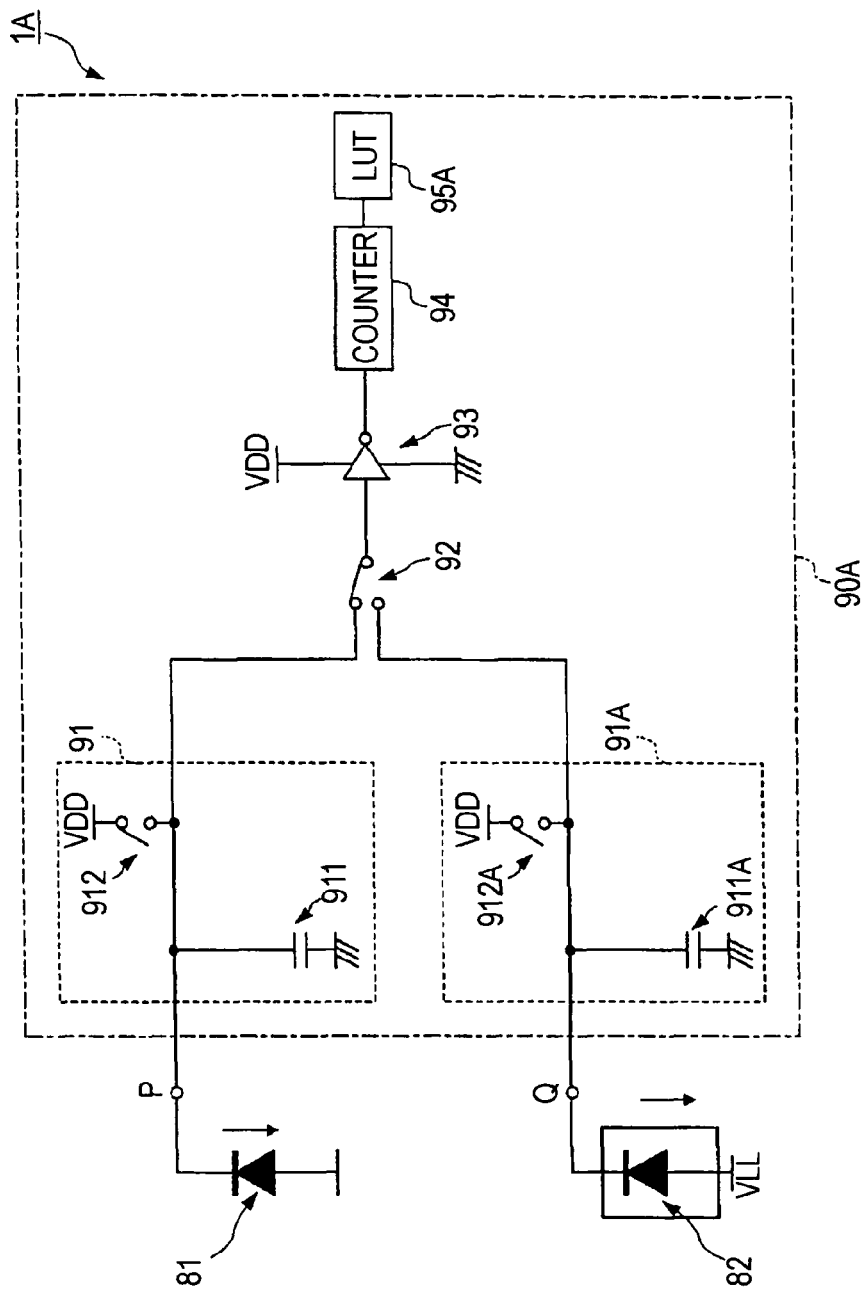
FIG. 4 is a circuit diagram of a photoreceptor device according to a second embodiment of the invention.

FIG. 4 is a circuit diagram of a photoreceptor device 1A according to a second embodiment of the invention.

The photoreceptor device 1A according to the second embodiment differ in the operation of an LUT 95A compared with the operation of the LUT 95A in the first embodiment.

Similarly to the LUT 95 in the first embodiment, the LUT 95A detects an illuminance of ambient light on the basis of times measured by the counter 94, and corrects the detected illuminance of ambient light on the basis of the voltage at the terminal P with the first PIN diode 81 in the light-shielded state and the voltage at the terminal Q.

Now, an operation of the LUT 95A will be described with reference to FIGS. 5A and 5B.

Figure 5A:
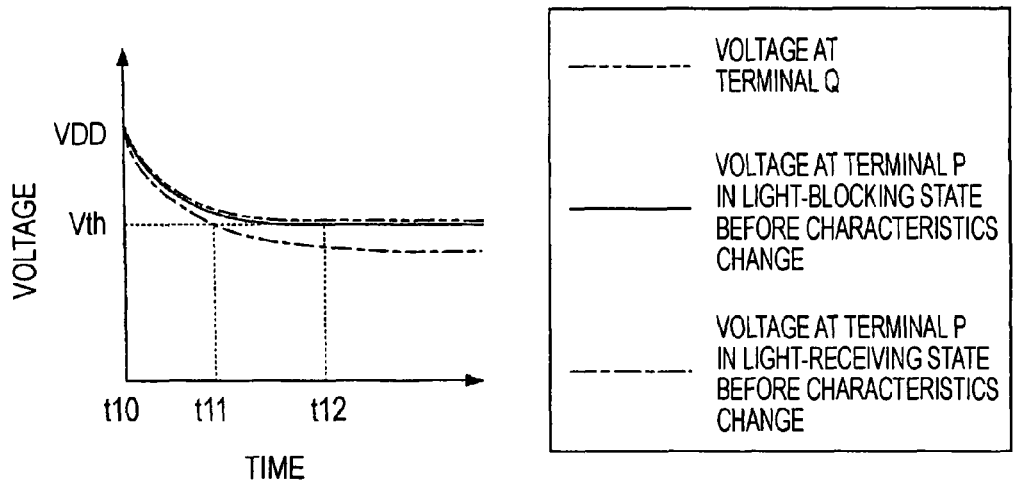
FIGS. 5A and 5B are timing charts of the photoreceptor device.
Figure 5B:
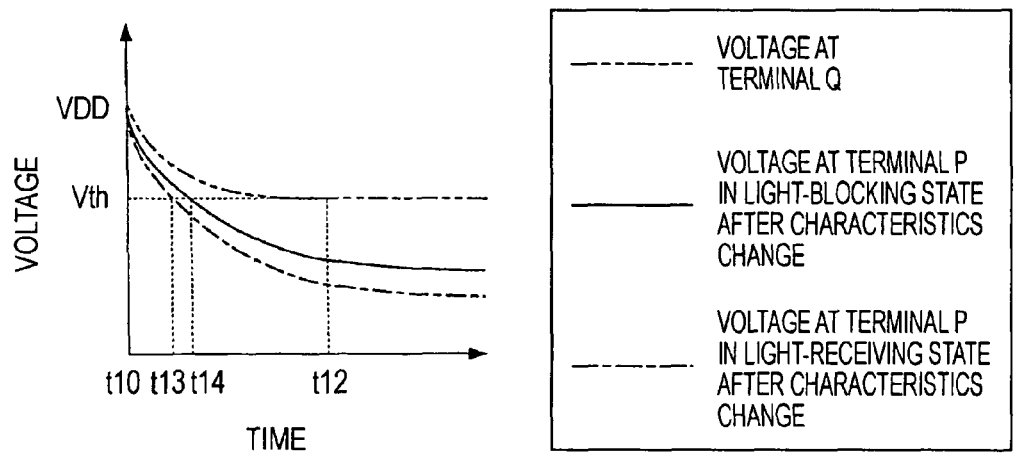

FIGS. 5A and 5B show change in the voltages at the terminals P and Q in relation to elapse of time, with the horizontal axis representing time and the vertical axis representing voltage. In FIGS. 5A and 5B, the time represented along the horizontal axis is sufficiently shorter than the time it takes for change in the characteristics of the first PIN diode 81, and Vth denotes the threshold voltage of the inverter 93.

First, the voltage at the terminal Q is measured. Similarly to the cases indicated by the double-dotted line in FIG. 2A and the double-dotted line in FIG. 2B, the voltage at the terminal Q gradually decreases as time elapses, as indicated by a double-dotted line in FIG. 5A and a double-dotted line in FIG. 5B.

Thus, the voltage at the terminal Q, which is the voltage VDD at time t10, gradually decreases and becomes the voltage Vth at time t12.

Before the characteristics of the first PIN diode 81 change, although not actually measured, the voltage at the terminal P with the first PIN diode 81 in the light-shielded state and the voltage at the terminal P with the first PIN diode 81 in the light-receiving state decrease as time elapses, as indicated by a solid line and a single-dotted line in FIG. 5A.

Thus, before the characteristics of the first PIN diode 81 change, when the first PIN diode 81 is in the light-shielded state, the voltage at the terminal P, which is the voltage VDD at time t10, becomes the voltage Vth at time t12.

Furthermore, before the characteristics of the first PIN diode 81 change, when the first PIN diode 81 is in the light-receiving state, the voltage at the terminal P, which is the voltage VDD at time t10, becomes the voltage Vth at time t11.

Then, after the characteristics of the first PIN diode 81 change, the voltage at the terminal P with the first PIN diode 81 in the light-shielded state is measured. Then, similarly to the case indicated by the solid line in FIG. 2B, compared with the voltage at the terminal P measured in the light-shielded state before the characteristics of the first PIN diode 81 change, indicated by a solid line in FIG. 5A, the voltage at the terminal P measured in the light-shielded state after the characteristics of the first PIN diode 81 change decrease rapidly as time elapses, as indicated by a solid line in FIG. 5B.

Thus, after the characteristics of the first PIN diode 81 change, when the first PIN diode 81 is in the light-shielded state, the voltage at the terminal P, which is the voltage VDD at time t10, becomes the voltage Vth at time t14.

Then, the voltage at the terminal P with the first PIN diode 81 in the light-receiving state is measured. Then, similarly to the case indicated by the single-dotted line in FIG. 2B, compared with the voltage at the terminal P measured in the light-shielded state after the characteristics of the first PIN diode 81 change, indicated by a solid line in FIG. 5B, the voltage at the terminal P measured in the light-receiving state after the characteristics of the first PIN diode 81 change rapidly decreases as time elapses, as indicated by a single-dotted line in FIG. 5B.

Thus, after the characteristics of the first PIN diode 81 change, when the first PIN diode 81 is in the light-receiving state, the voltage at the terminal P, which is the voltage VDD at time t10, becomes the voltage Vth at time t13.

Thus, after the characteristics of the first PIN diode 81 change, first, an illuminance of ambient light is detected in the following manner.

At time t13, the inverter 93 outputs the voltage VDD on the basis of the voltage at the terminal P, so that the counter 94 starts time measurement. Then, at time t12, the inverter 93 outputs the voltage VDD on the basis of the voltage at the terminal Q, so that the counter 94 finished time measurement. Thus, on the basis of the period measured by the counter 94, i.e., the period from time t13 to time t12, the LUT 95A detects an illuminance of ambient light.

Then, the detected illuminance of ambient light is corrected in the following manner.

First, on the basis of the period from time t14 to time t12, i.e., the period from the time when the voltage at the terminal P measured in the light-shielded state after the characteristics of the first PIN diode 81 change becomes the voltage Vth to the time when the voltage at the terminal Q becomes the voltage Vth, an amount of change in illuminance that is attributable to the effect of the change in the characteristics of the first PIN diode 81 due to reception of light is obtained. Then, the amount of change in illuminance is added to the detected illuminance of ambient light.

According to this embodiment, the following advantages are achieved.

On the basis of the voltage at the terminal P with the first PIN diode 81 in the light-shielded state and the voltage at the terminal Q, the LUT 95A corrects an illuminance of ambient light detected by the illuminance detecting circuit 90A.

More specifically, first, the voltage at the terminal P is measured with the first PIN diode 81 in the light-shielded state, and also the voltage at the terminal Q is measured. Then, the difference between the voltage at the terminal P and the voltage at the terminal Q that have been measured, i.e., the effect of change in the characteristics of the first PIN diode 81 due to reception of ambient light, is obtained. Then, the voltage at the terminal P is measured with the first PIN diode 81 in the light-receiving state. Then, on the basis of the difference described above, the LUT 95 corrects the illuminance of ambient light detected by the illuminance detecting circuit 90A.

Thus, the illuminance of ambient light detected by the illuminance detecting circuit 90A is corrected in consideration of the effect of change in the characteristics of the first PIN diode 81 due to reception of ambient light. Accordingly, even when the characteristics of the first PIN diode 81 change, error can be reduced in detection of the illuminance of ambient light.

Third Embodiment

Figure 6:
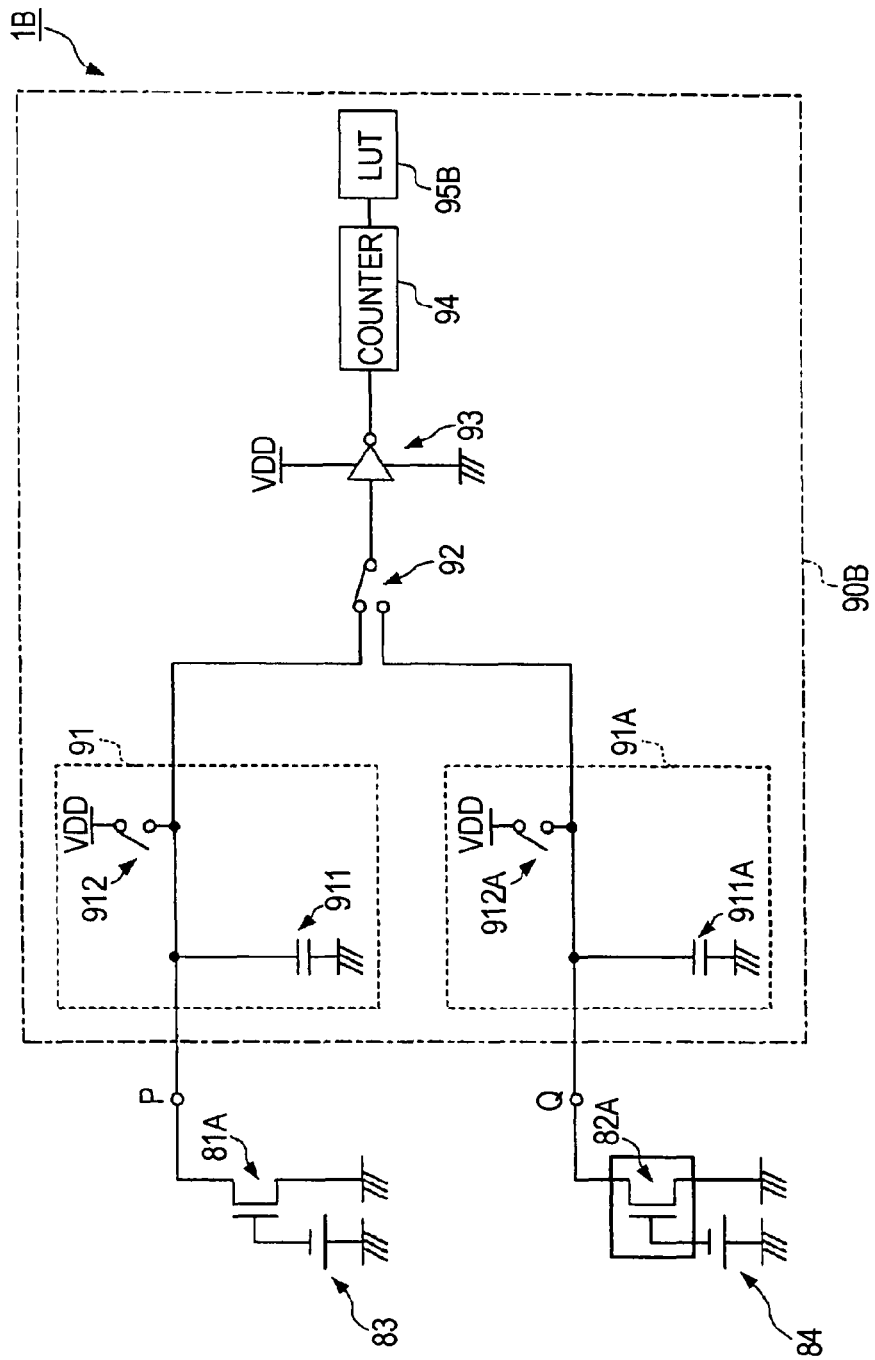
FIG. 6 is a circuit diagram of a photoreceptor device according to a third embodiment of the invention.

FIG. 6 is a circuit diagram of a photoreceptor device 1B according to a third embodiment of the invention.

The photoreceptor device 1B according to the third embodiment differs from the photoreceptor device 1A according to the second embodiment with respect to the configurations of a first photoelectric converter element and a second photoelectric converter element, and with respect to the operation of an LUT 95B compared with the operation of the LUT 95A in the second embodiment.

The photoreceptor device 1B includes a first phototransistor 81A as a first photoelectric converter element, a first driving power supply 83 that supplies a driving voltage to the first phototransistor 81A, a second phototransistor 82A as a second photoelectric converter element, a second driving power supply 84 that supplies a driving voltage to the second phototransistor 82A, and an illuminance detecting circuit 90B.

The first phototransistor 81A takes on either a light-receiving state, in which ambient light is received, or a light-shielded state, in which ambient light is blocked.

The source of the first phototransistor 81A is connected to the terminal P, the drain of the first phototransistor 81A is connected to the voltage GND of the reference power supply, and the gate of the first phototransistor 81A is connected to the first driving power supply 83.

An OFF voltage is supplied from the first driving power supply 83 to the gate of the first phototransistor 81A, so that the first phototransistor 81A in an OFF state. When the first phototransistor 81A is in the light-receiving state, the first phototransistor 81A in the OFF state outputs a leakage current in the direction from the source to the drain thereof in accordance with the illuminance of ambient light and factors such as the temperature of the first phototransistor 81A itself. On the other hand, when in the light-shielded state, the first phototransistor 81A outputs a leakage current in the direction from the source to the drain thereof in accordance with the effect of factors other than the illuminance of ambient light, such as the temperature of the first phototransistor 81A itself.

The leakage current output from the first phototransistor 81A causes charges accumulated at the capacitor 911 to be released gradually, so that the voltage that appears at the terminal P corresponds to charges remaining at the capacitor 911.

The second phototransistor 82A is always in a light-shielded state.

The source of the second phototransistor 82A is connected to the terminal Q, the drain of the second phototransistor 82A is connected to the voltage GND of the reference power supply, and the gate of the second phototransistor 82A is connected to the second driving power supply 84.

An OFF voltage is supplied from the second driving power supply 84 to the gate of the second phototransistor 82A, so that the second phototransistor 82A is in an OFF state. Since the second phototransistor 82A is always in the light-shielded state, the second phototransistor 82A in the OFF state outputs a leakage current in the direction from the source to the drain thereof in accordance with the effects of factors other than the illuminance of ambient light, such as the temperature of the second phototransistor 82A itself.

The leakage current output from the second phototransistor 82A causes charges accumulated at the capacitor 911A to be released gradually, so that the voltage that appears at the terminal Q corresponds to charges remaining at the capacitor 911A.

Compared with the LUT 95A in the second embodiment, the LUT 95B in this embodiment operates in the following manner.

The LUT 95A in the second embodiment obtains an amount of change in illuminance that is attributable to the effect of change in the characteristics of the first PIN diode 81 due to reception of ambient light, on the basis of the voltage at the terminal P with the first PIN diode 81 in the light-shielded state and the voltage at the terminal Q, and the amount of change in illuminance is added to an illuminance of ambient light detected by the illuminance detecting circuit 90A.

On the other hand, the LUT 95B in this embodiment sets the terminal P and the terminal Q at equal potentials by controlling either one of or both an OFF voltage supplied from the first driving power supply 83 to the gate of the first phototransistor 81A and an OFF voltage supplied from the second driving power supply 84 to the gate of the second phototransistor 82A.

According to this embodiment, the following advantages are achieved.

The LUT 95B controls either one of or both an OFF voltage supplied from the first driving power supply 83 to the gate of the first phototransistor 81A and an OFF voltage supplied from the second driving power supply 84 to the gate of the second phototransistor 82A.

More specifically, first, the voltage at the terminal P is measured with the first phototransistor 81A in the light-shielded state, and also the voltage at the terminal Q is measured. Then, the difference between the voltage at the terminal P and the voltage at the terminal Q that have been measured, i.e., the effect of the change in the characteristics of the first phototransistor 81A due to reception of ambient light, is obtained. Then, on the basis of the difference, either one of or both an OFF voltage supplied from the first driving power supply 83 to the gate of the first phototransistor 81A and an OFF voltage supplied from the second driving power supply 84 to the gate of the second phototransistor 82A are controlled.

As described above, the voltage at the terminal P with the first phototransistor 81A in the light-shielded state and the voltage at the terminal Q become equal. Thus, the effect of the change in the characteristics of the first phototransistor 81A due to reception of ambient light is removed from the voltage at the terminal P with the first phototransistor 81A in the light-shielded state and the voltage at the terminal Q. Accordingly, even when the characteristics of the first phototransistor 81A change due to reception of light, error can be reduced in detection of the illuminance of ambient light.

Modifications

The invention is not limited to the embodiments described above, and modifications, alternatives, or the like that do not depart from the spirit of the invention falls within the scope of the invention.

For example, although PIN diodes are used as photoelectric converter elements in the first and second embodiment and phototransistors are used as photoelectric converter elements in the third embodiment, without limitation to PIN diodes and phototransistors, for example, photodiodes may be used.

Furthermore, although the photoreceptor device 1 is provided in the cellular phone 2 in the first embodiment, without limitation to the cellular phone 2, the photoreceptor device 1 may be provided, for example, in a personal digital assistant or a liquid crystal television set.

Furthermore, in the first embodiment, when the cellular phone 2 is folded, the LUT 95 measures the voltage at the terminal P with the first PIN diode 81 in the light-shielded state. However, without limitation, for example, the photoreceptor area 21 may be shielded from light by a certain light-shielding mechanism in response to an operation of a predetermined operation button 10 so that the LUT 95 measures the voltage at the terminal P with the first PIN diode 81 in the light-shielded state.

The entire disclosure of Japanese Patent Application Nos. 2006-185206, filed July 5, and 2007-23805, filed February 2 are expressly incorporated by reference herein.

What is claimed is:
1. A photoreceptor device comprising:
a photoreceptor unit that converts received light into an electric signal and that outputs the electric signal, the photoreceptor unit including a first photoelectric converter element and a second photoelectric converter element;

a detector that detects an illuminance of ambient light received by the photoreceptor unit, on the basis of the electric signal; and a correcting unit that corrects the illuminance of ambient light detected by the detector, on the basis of a difference between a first electric signal from the first photoelectric converter element in a light-shielded state and a second electric signal from the second photoelectric converter element, wherein the second photoelectric converter element does not receive ambient light.

2. The photoreceptor device according to claim 1, wherein the first photoelectric converter element is configured to receive an amount of ambient light controlled by an amount-of-light controller.

3. The photoreceptor device according to claim 1, wherein the illuminance of ambient light detected by the detector is corrected by controlling either one of or both the first electric signal output from the first photoelectric converter element and the second electric signal output from the second photoelectric converter element.

4. A liquid crystal apparatus comprising:
a liquid crystal panel;
an illuminating device that illuminates the liquid crystal panel; and
a photoreceptor device;
wherein the photoreceptor device includes:
a photoreceptor unit that converts received light into an electric signal and that outputs the electric signal, the photoreceptor unit including a first photoelectric converter element and a second photoelectric converter element;
a detector that detects an illuminance of ambient light received by the photoreceptor unit, on the basis of the electric signal; and
a correcting unit that corrects the illuminance of ambient light detected by the detector, on the basis of a difference between a first electric signal from the first photoelectric converter element in a light-shielded state and a second electric signal from the second photoelectric converter element,
wherein an amount of light emitted by the illuminating device is controlled on the basis of the amount of ambient light detected by the photoreceptor device, and
wherein the second photoelectric converter element does not receive ambient light.

5. The liquid crystal apparatus according to claim 4, wherein the first photoelectric converter element is configured to receive an amount of ambient light controlled by an amount-of-light controller.

6. The liquid crystal apparatus according to claim 4, wherein the illuminance of ambient light detected by the detector is corrected by controlling either one of or both the first electric signal output from the first photoelectric converter element and the second electric signal output from the second photoelectric converter element.

7. An electronic apparatus comprising:
a first portion including a photoreceptor device; and
a second portion movably attached to the first portion so as to allow shielding the photoreceptor device from light;
wherein the photoreceptor device includes:
a photoreceptor unit that converts received light into an electric signal and that outputs the electric signal, the photoreceptor unit including a first photoelectric converter element and a second photoelectric converter element;
a detector that detects an illuminance of ambient light received by the photoreceptor unit, on the basis of the electric signal; and
a correcting unit that corrects the illuminance of ambient light detected by the detector, on the basis of a difference between a first electric signal from the first photoelectric converter element in a light-shielded state and a second electric signal from the second photoelectric converter element, and
wherein the second photoelectric converter element does not receive ambient light.

8. The photoreceptor device according to claim 1, wherein the illuminance of ambient light detected by the detector is corrected by controlling the first electric signal output from the first photoelectric converter element and the second electric signal output from the second photoelectric converter element to be equal.

9. The liquid crystal apparatus according to claim 4, wherein the illuminance of ambient light detected by the detector is corrected by controlling the first electric signal output from the first photoelectric converter element and the second electric signal output from the second photoelectric converter element to be equal.

10. The electronic apparatus according to claim 7, wherein the illuminance of ambient light detected by the detector is corrected by controlling the first electric signal output from the first photoelectric converter element and the second electric signal output from the second photoelectric converter element to be equal.

11. The photoreceptor device according to claim 1, wherein the first and second photoelectric converter elements are selected from the group consisting of: PIN diodes, phototransistors and photodiodes.

12. The liquid crystal apparatus according to claim 4, wherein the first and second photoelectric converter elements are selected from the group consisting of: PIN diodes, phototransistors and photodiodes.

13. The electronic apparatus according to claim 7, wherein the first and second photoelectric converter elements are selected from the group consisting of: PIN diodes, phototransistors and photodiodes.

14. The photoreceptor device according to claim 1, wherein the first photoelectric converter element is configured to receive ambient light and to be shielded from ambient light based on an amount-of-light controller.

15. The liquid crystal apparatus according to claim 4, wherein the first photoelectric converter element is configured to receive ambient light and to be shielded from ambient light based on an amount-of-light controller.

16. The electronic apparatus according to claim 7, wherein the first photoelectric converter element is configured to receive ambient light and to be shielded from ambient light based on an amount-of-light controller.

* * * * *